July 7, 1953  J. B. ARMITAGE  2,644,370
PATTERN CONTROLLED MILLING MACHINE
Filed Dec. 20, 1947  5 Sheets-Sheet 5

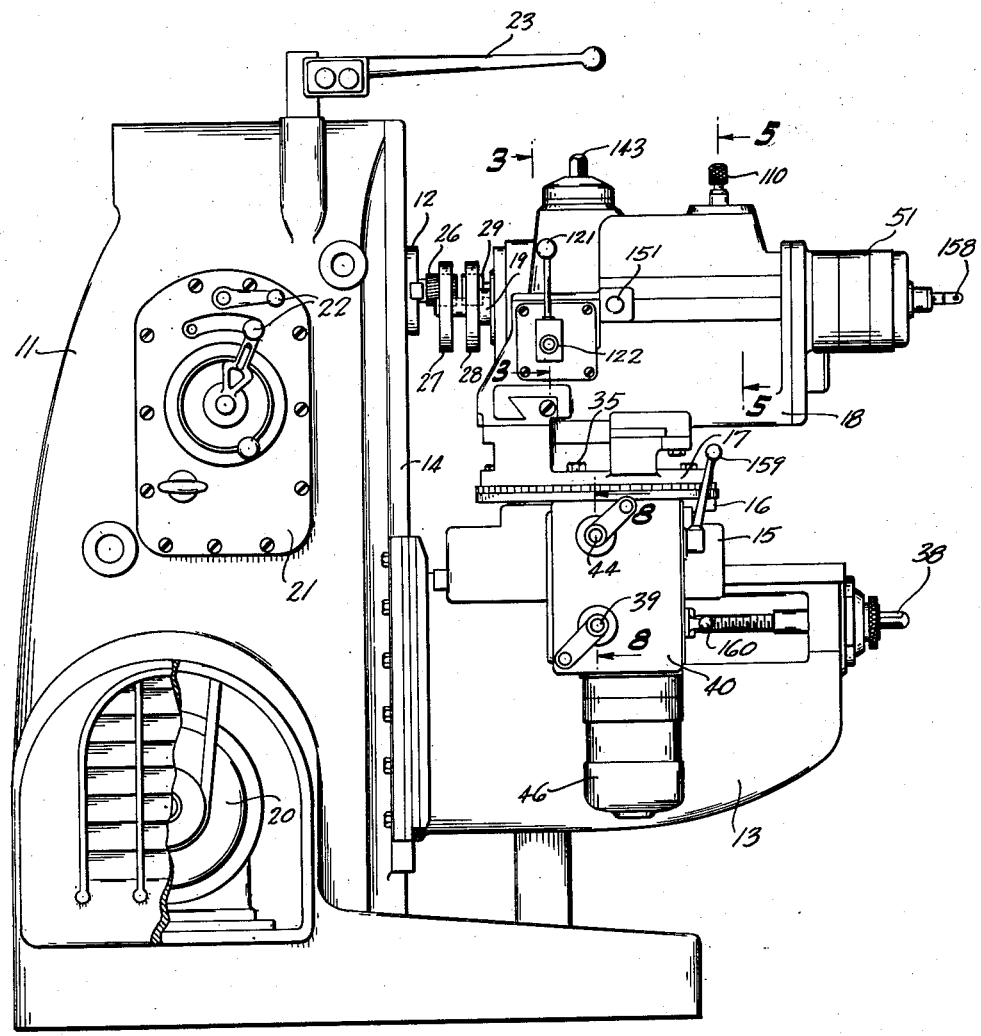

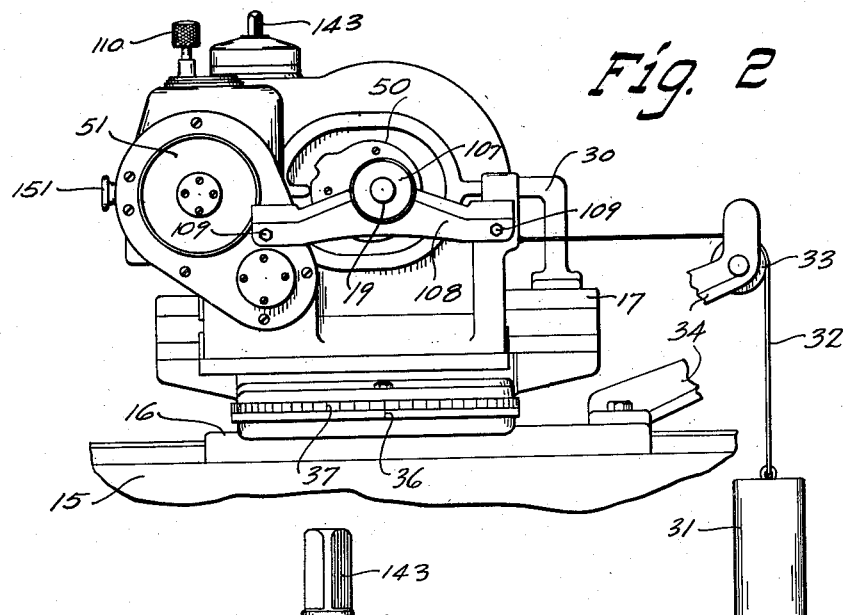
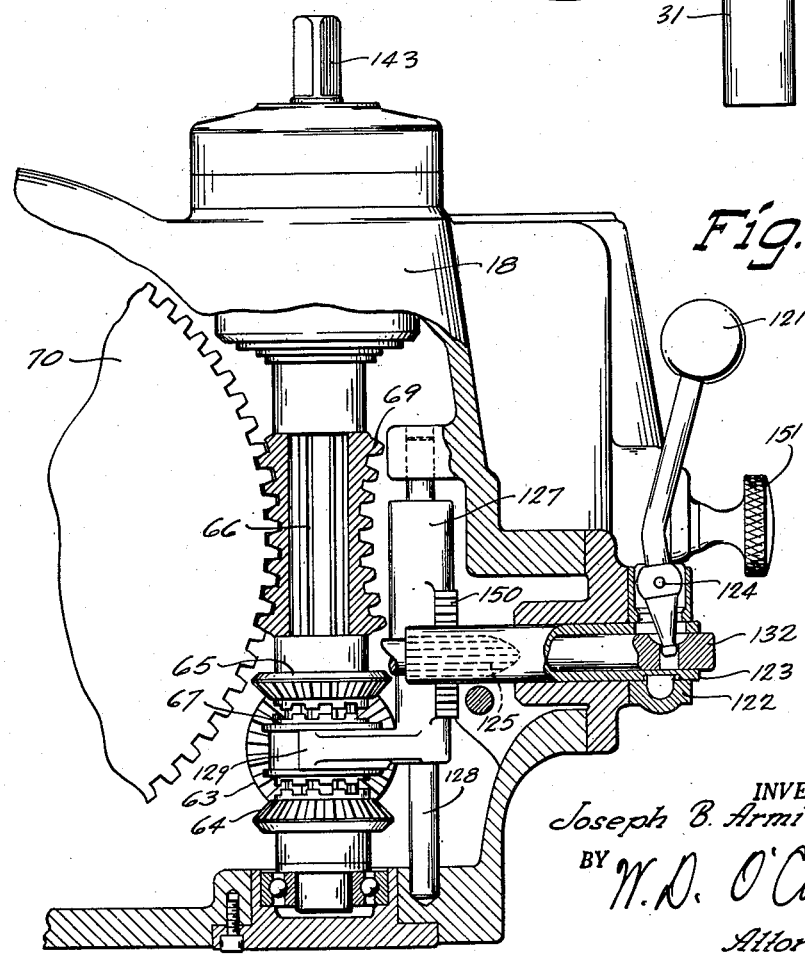

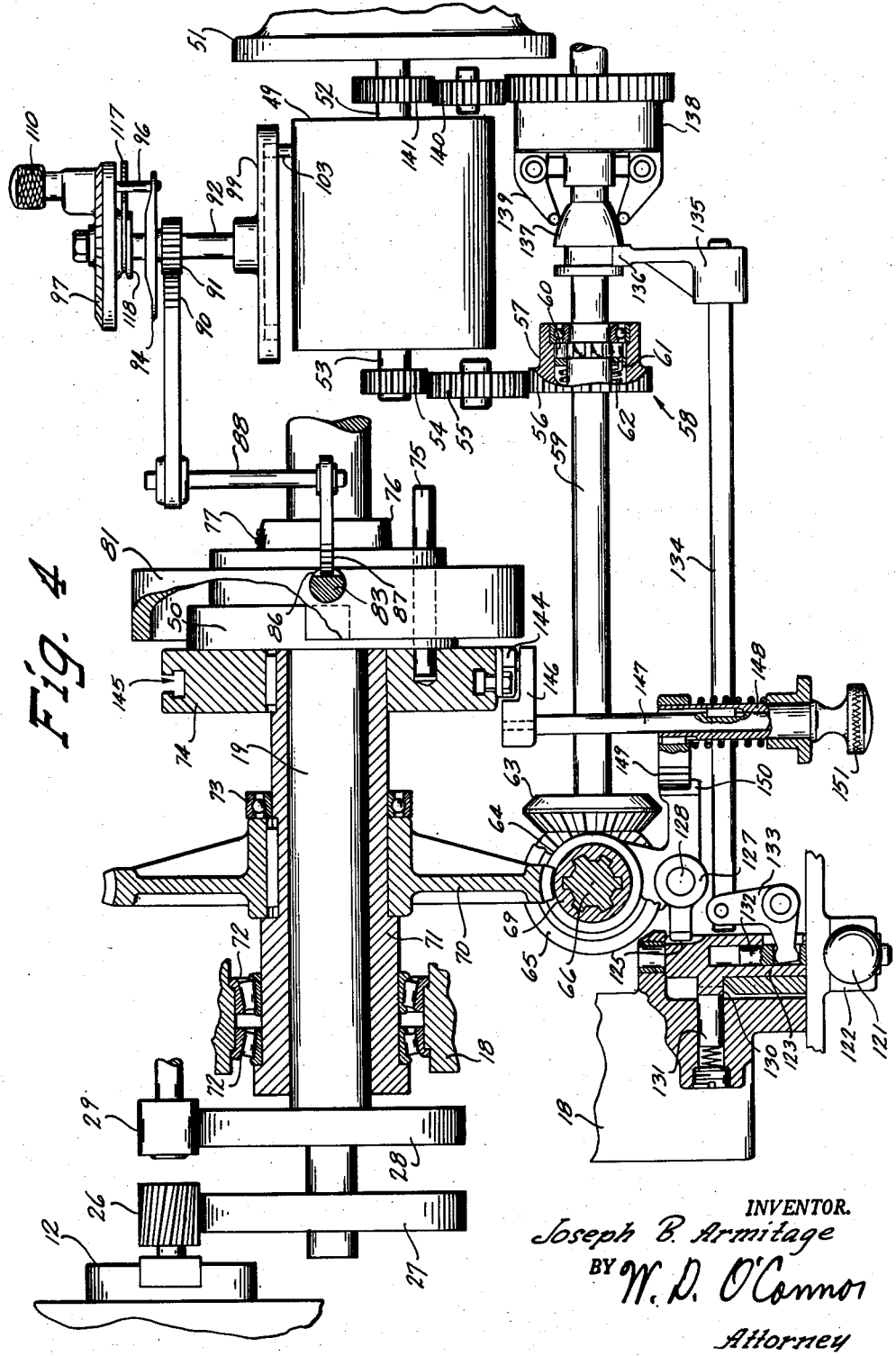

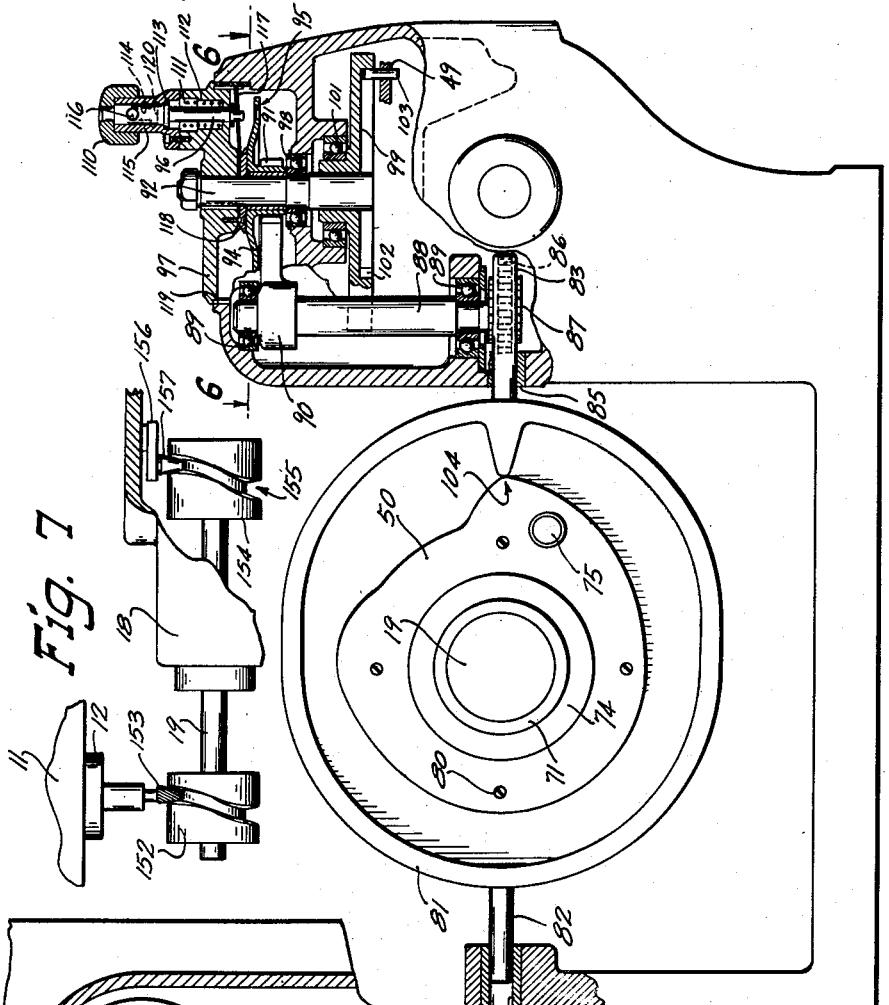

INVENTOR.
Joseph B. Armitage
BY W. D. O'Connor
Attorney

Patented July 7, 1953

2,644,370

UNITED STATES PATENT OFFICE 2,644,370

PATTERN CONTROLLED MILLING MACHINE

Joseph B. Armitage, Wauwatosa, Wis., assignor to Kearney & Trecker Corporation, West Allis, Wis., a corporation of Wisconsin Application December 20, 1947, Serial No. 792,997

14 Claims. (Cl. 90—13.4)

This invention relates, generally, to improvements in machine tools, and more particularly to improved actuating and controlling mechanism especially adapted for effecting and regulating the operation of pattern controlled machine tools.

A general object of this invention is to provide more efficient actuating and controlling apparatus for a machine tool.

Another object is to provide an improved pattern controlled machine tool adapted to function at maximum efficiency in machining a surface of irregular contour on a workpiece.

Another object is to provide a pattern controlled machine tool adapted to machine a surface of irregular contour on a cam workpiece of either the face or the barrel type with equal facility.

Another object is to provide improved automatic means for controlling and adjusting a variable speed transmission of the stepless type.

Another object is to provide, in a pattern controlled machine tool, a work carrying spindle selectively positionable either transversely of or axially parallel with a tool carrying spindle, together with automatic means for varying the relative displacement therebetween.

Another object is to provide a work carrying spindle adapted to be driven at a fast rapid traverse rate of speed or at a predeterminately variable rate of speed in cooperative relationship with a tool carrying support, and having tripping mechanism adjustable to selectively change the speed rate thereof.

Another object is to provide an improved pattern controlled machine tool adapted to maintain automatically a substantially constant rate of machining action regardless of the shape of the contour being machined and including adjusting mechanism effective to vary the allowable range in which the rate of machining action is maintained substantially constant.

Another object is to provide improved automatic means in combination with independently operable manually movable means for controlling and adjusting a variable speed transmission.

Another object is to provide an improved manually operable controlling mechanism for a pattern controlled milling machine, adapted to permit single lever control of the workpiece carrying spindle at a predetermined feeding rate of speed, a fast rate of speed for positioning, or a reversal in direction of rotation at either the feed or fast rates of speed.

Another object of the invention is to provide improved selectively operable manual and power driven means for positioning the work carrying spindle relative to the tool carrying spindle in a machine of the pattern controlled type.

A further object is to provide a pattern controlled machine tool adapted to machine a groove combining any variety of helical angles in the outer periphery of an elongated cylindrical workpiece as well as to machine an irregularly shaped contour on the outer periphery of a flat circular workpiece with equal facility.

A further object is to provide an improved cutting feed mechanism in which any of various rates of relative tool and work movement may be pre-selected and maintained constant in spite of conditions normally tending to vary the feed rate in different portions of the cutting movement as, for example, in pattern controlled movements where the actual feed rate normally varies according to changes of form in the contour which is being machined.

A still further purpose is generally to simplify the construction and operation of transmission and control means for machine tools, particularly for machines incorporating some of the previously mentioned improvements, and especially for milling machines, and still other objects will be apparent from the following description taken in connection with the claims.

According to this invention, an improved pattern controlled machine tool for forming contoured surfaces is provided with control means functioning automatically to maintain the rate of relative feeding movement between a forming tool and a workpiece substantially constant regardless of the shape of the pattern being followed. In a preferred embodiment utilizing a rotary forming tool, the pattern is formed in the shape and size of the contour which it is desired to reproduce on the workpiece, and it is engaged by a follower roller of diameter exactly equal to that of the rotary tool. Yieldable feeding means are arranged to maintain the rotating pattern in engagement with the cooperating follower roller and, simultaneously therewith, to maintain the rotating workpiece in engagement with the rotary tool. In pattern controlled machine tools of the usual construction, the cutting action of the rotary forming tool upon the workpiece varies considerably with changes in the slope or angle of the contour of the pattern and its radial position, the actual feeding rate being comparatively slow at some points and very much faster at others, depending particularly upon the amount of movement occurring along steep elements of the pattern. To obviate this difficulty, operation of the guiding pattern is coordinated with the operation of a cooperatively formed feed regulating cam that is operatively connected to adjust an infinitely variable speed transmission which directly controls the rotational feeding rate of the workpiece. Thus, as the workpiece is revolved relative to the rotary forming tool, the guiding pattern and the feed regulating cam exert a continuous and synchronous control to guide the path of cutting action generated between the workpiece and the forming tool and, likewise, to vary the rotational feeding rate for promoting a relatively uniform rate of cutting action. Guiding patterns of various shapes and sizes, and cooperating follower rollers of various diameters may be utilized in combination with appropriate feed regulating cams of the required configuration. Improved control means are provided for effecting manual control of the movement of the pattern and workpiece toward or away from the follower and cutter and for effecting reversal in the direction of feeding movement of the workpiece relative to the cutter.

The foregoing and other objects of this invention, which will become more fully apparent from the following detailed specification, may be achieved by the particular pattern controlled milling machine constituting an exemplifying embodiment of the invention illustrated in and described in connection with the accompanying drawings, in which:

Figure 1 is a view in left side elevation of a pattern controlled milling machine constituting apparatus incorporating the invention in a preferred practical form;

Fig. 2 is a view in rear elevation of the work spindle head including parts of its associated supporting members;

Fig. 3 is an enlarged fragmentary view of the work spindle controlling and driving mechanism, taken in vertical section substantially along the line 3—3 in Fig. 1;

Fig. 4 is an expanded, partly diagrammatic plan view showing the mechanical transmission mechanism for actuating the various movable elements of the spindle head, and part of the control mechanism therefor;

Fig. 5 is an enlarged view in vertical, transverse section of the feed rate controlling mechanism, taken generally along the line 5—5 in Fig. 1;

Fig. 6 is an enlarged detailed view of part of the feed rate controlling mechanism, taken in horizontal section along the line 6—6 in Fig. 5;

Fig. 7 is a fragmentary diagrammatic view showing a modified application of the work forming mechanism;

Figure 8:
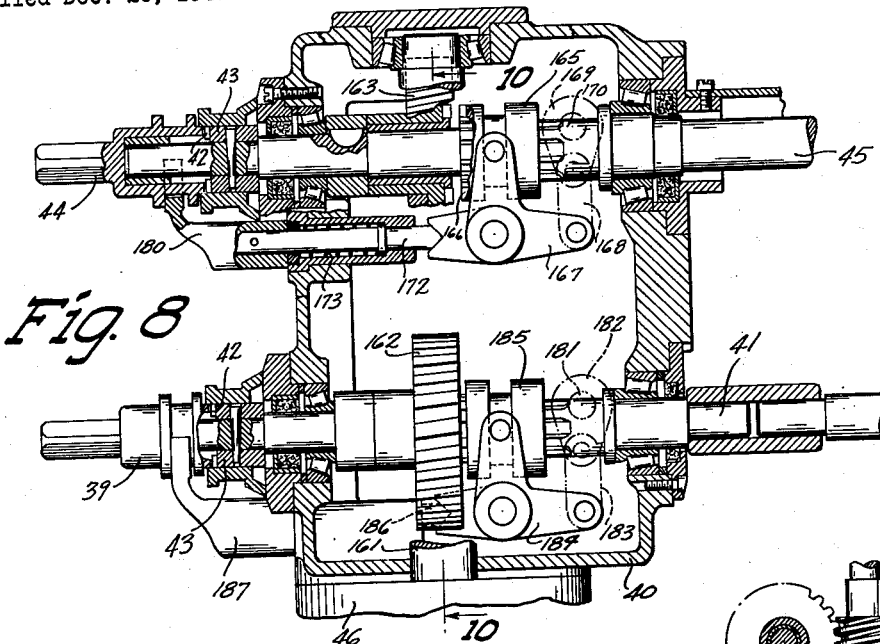
Fig. 8 is an enlarged detailed view of mechanism adapted to effect and to control the movement of work spindle supporting members, taken in vertical section along the line 8—8 in Fig. 1.
Figure 9:
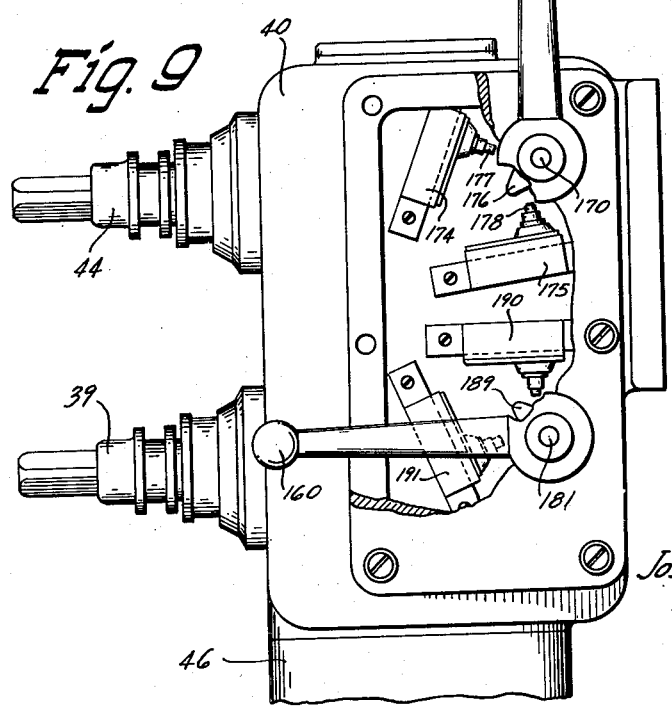
Figure 10:
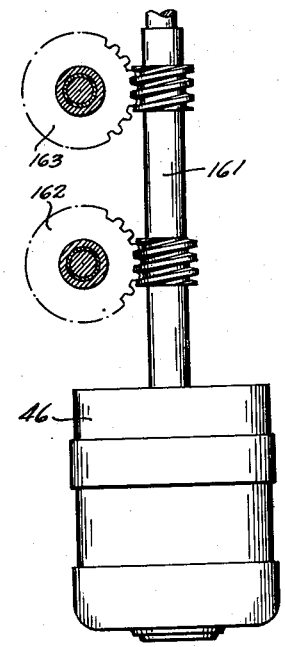

Fig. 9 is an enlarged detailed frontal view of controlling mechanism adapted to effect transverse or longitudinal movement of the work spindle head with a portion of the cover broken away to show the micro-switches operably disposed therein; and Fig. 10 is a fragmentary diagrammatic view of power transmitting mechanism for movement of the spindle head, taken in vertical, transverse section along the line 10—10 in Fig. 8.

The particular pattern controlled machine tool illustrated in the drawings as exemplifying apparatus of the class adapted to be constructed and operated in accordance with the present invention, is primarily a milling machine of the knee and column type, although it is to be understood that the invention may be applied to other machine tools of different construction with equal advantage.

Referring more specifically to the drawings and particularly to Figs. 1 and 2 thereof, the milling machine there shown incorporates a practical operative embodiment of improved pattern controlled contour forming mechanism to which this invention is directed, the entire apparatus being fully described herein by way of a complete disclosure.

As shown in the drawings, the milling machine is of the horizontal spindle, knee and column type comprising essentially a base and upstanding column 11 that carries in its upper central part, a horizontal rotatably journalled tool spindle 12. Beneath the tool spindle 12 there are arranged a group of superimposed relatively movable work supporting members also movably carried by the column 11, the primary member being a knee 13 slidably mounted for vertical movement along the forward face 14 of the column. The knee 13 carries a saddle 15 slidably mounted thereon for horizontal movement toward or from the column and that functions to carry a work supporting table 16 mounted thereon for horizontal longitudinal movement transversely to the axis of the tool spindle 12. The upper surface of the table 16 is provided with an enlarged circular platform adapted to rotatably receive a work spindle head support 17. A spindle head 18 having a horizontal work carrying spindle 19 rotatably journalled therein, is slidably carried by the support 17 for lateral adjustment thereon in cooperating relationship with the tool spindle 12.

Power for driving the tool spindle 12 is derived from a motor 20 mounted within the base of the column 11 and connected through a main drive clutch (not shown) to drive an adjustable speed transmission mechanism, carried by a housing 21 bolted in the left side of column, and which, in turn, is directly connected to drive the tool spindle 12. To adjust the rate of spindle rotation, levers 22 on the side of the transmission housing 21 are manually movable to effect a selective change in the driving ratio obtainable in the speed transmission. A control lever 23 carries push buttons arranged to selectively energize the drive motor 20 and the lever is manually operable to effect engagement of the main drive clutch for operably connecting the motor 20 to drive the tool spindle 12 through the transmission.

With the spindle head 18 positioned as indicated in Figs. 1 and 2, the tool spindle 12 and work spindle 19 are in axially parallel relationship as there shown, and a cutter 26 mounted on the tool spindle 12 is in work engaging relationship with a workpiece 27 mounted on the work spindle 19. In order that the workpiece 27 may be formed to a predetermined irregular peripheral contour by cutting action of the rotating cutter 26, the workpiece is rotated and simultaneously therewith is moved toward or away from the cutter 26. To provide for this lateral displacement of the workpiece 27 relative to the cutter 26, a pattern 28 having the same configuration as that to be formed on the workpiece 27 is removably mounted on the work spindle 19. A follower roller 29 engageable with the irregularly contoured pattern 28, is carried by a bracket 30 removably mounted on the spindle head support 17, as shown in Figs. 1 and 2. In order to maintain a continuing engagement between the follower roller 29 and the rotating pattern 28, the laterally slidable spindle head 18 is urged rightwardly with yieldable force exerted by means of a vertically movable weight 31 connected thereto by a flexible cable 32 threaded over a pulley 33. The pulley 33 is carried by a supporting bracket 34 removably attached to the table 16 in such manner that a direct outward horizontal pull is exerted on the spindle head 18 by the vertically movable weight 31.

For positioning the work spindle 19 either axially parallel, as shown in Figs. 1 and 2, or transversely to the tool spindle 12, the spindle head 18 may be pivoted bodily by rotating the head support 17 on the circular platform provided on the upper surface of the table 16. Suitable clamping bolts (not shown) adapted to receive clamping nuts 35, are provided for locking the head support 17 to the table 16 in any of its angularly adjusted positions. To indicate the angular position of the work spindle 19 with respect to the tool spindle 12, a zero mark 36 is scribed on the upper portion of the table and appropriate indicia 37 are provided around the outer periphery of the head support 17.

In order that the work spindle 19 may be moved into operating relationship with the tool spindle 12, the work supporting members are vertically movable by means of a crank (not shown) applied to a squared end 38 of a shaft protruding from the front face of the knee 13 to actuate a screw and nut mechanism or the like functioning in a well known manner to move the knee 13 vertically along the face 14 of the column 11. Vertical movement of the knee 13 effects a corresponding vertical movement of the saddle 15, table 16, head support 17 and spindle head 18.

To provide for manually moving the saddle 15 toward or away from the face 14 of the column, a hand crank (not shown) may be applied to the squared end of a shaft 39 protruding leftwardly from a bracket 40 which is mounted on the saddle 15. As shown in Figs. 1 and 8, the shaft 39 is operatively connected to rotate a shaft 41 for actuating a screw and nut mechanism in a well known manner. The inner end of the shaft 39 is provided with clutch teeth 42 normally disposed to engage complementary clutch teeth formed on a collar 43 pinned to the shaft 41. In a similar manner, the table 16 may be moved longitudinally on the saddle 15 by applying a hand crank (not shown) to the squared end of a shaft 44 protruding leftwardly from the bracket 40 and which is operatively connected to rotate a feed screw 45, as shown in Fig. 8. A nut (not shown) is secured within the table 16 in a manner to have meshing engagement with the feed screw 45 which is journalled at its outward ends in the saddle 15. Thus, rotating the feed screw within its cooperating non-rotating nut will effect the desired longitudinal movement of the table 16.

To facilitate movement of the saddle 15 and the table 16 for selectively positioning the spindle head 18, power operable means are also provided, the power for effecting these respective movements being derived from a motor 46, as shown in Figs. 1, 8 and 9. For finally moving the work spindle 19 into the desired work engaging relationship with the tool spindle 12, manual adjustment of the spindle head supporting members is preferably employed. After the initial positioning has been effected, however, withdrawal or advancement of the work spindle 19 toward the tool spindle 12 may be more conveniently effected by power movement of the spindle head supporting members. This facilitates loading and unloading of a workpiece on the work spindle 19 in the interval between actual machining operations, as will hereinafter be more fully explained.

In order to insure accurate reproduction of the pattern contour, it is necessary that the cutter 26 be of such diameter that its radius is somewhat less than the radius of the most sharply curved concave surface element to be formed on the workpiece 27. In the preferred construction illustrated in the drawings, the pattern 28 is provided with an external guiding surface of the exact size and shape of the contour required to be formed by the cutter on the workpiece, and the follower roller 29 is of diameter exactly equal to that of the cutter 26. Further, the follower roller is mounted in the vertical plane of the cutter spindle 12, and the spindle head support 17 with the bracket 30 mounted thereon are adjusted vertically to bring the follower 29 into exact axial alignment with the cutter 26, the arrangement being such that the relationship between the cutter and the workpiece is the exact duplicate of the relationship between the follower and the pattern.

Although satisfaction of the requirements as to the size and position of the pattern and cooperating follower roller relative to the workpiece and cutter will result in accurate reproduction of the desired contour, it does not necessarily result in the most effective operation of the machine. In pattern controlled machines of the usual construction, the cutting action of the cutter upon the workpiece varies considerably with changes in the slope or angle of the contour of the pattern and its radial position, the actual feeding rate being comparatively slow at some points and very much faster at others, depending particularly upon the amount of movement effected by steep elements of the pattern. Accordingly, the speed of operation of such a machine is ordinarily so limited that the maximum feeding rate at the steepest element of the pattern does not exceed that at which the desired degree of finish is attained, with the result that on other elements of the work, the feeding rate is much lower than it should be and the productive capacity of the machine is thus seriously restricted.

In order to obviate this limitation upon efficient operation, the rotational feeding rate of the workpiece is adapted, according to the present invention, to be automatically and predeterminately varied in direct relationship with the changes in the contour of the pattern. Thus, as the controlled guiding action exerted by the follower roller 29 in combination with the pattern 28 effects a lateral displacement of the workpiece 27 relative to the cutter 26, the rotational feeding rate of the workpiece 27 is automatically and predeterminately varied in accordance with the relative directional changes in cutter action. To this end there is provided an infinitely variable speed transmission 49 connectible to drive the work spindle 19 and adapted to be adjusted by mechanism actuatable by rotation of a feed regulating cam 50 removably mounted for rotation with the work spindle 19, as shown in Figs. 2 and 4. The pattern 28 and the feed regulating cam 50 are predeterminately formed to effect a coordinated control for guiding the path of cutting action and for adjusting the variable speed transmission 49 respectively, the arrangement being such that the pattern and cam are so mounted with respect to the work spindle 19 as to exert a continuous and synchronous control thereof and thereby promote a relatively uniform rate of cutting action.

Power for driving the work spindle 19 is derived from a motor 51 mounted on the spindle head 18, as shown in Figs. 1, 2, and 4, and energizable through an electrical circuit incorporated in the machine in a well known manner. A motor shaft 52 is arranged to transmit power from the motor 51 to drive the transmission 49 which may be of any infinitely variable stepless speed type. From an output shaft 53 of the transmission, power is transmitted through gears 54 and 55 to drive a gear 56 integrally formed on an outer rotatable housing 57 of an overrunning clutch 58. The overrunning clutch functions in a conventional well known manner in that power is transmitted from the rotatable housing 57 to a central, axially concentric, separately rotatable shaft 59 by means of frictional engagement of a series of rollers 60 positionable therebetween. The rollers 60 are retained in equally spaced relationship about the shaft 59 by a cage 61 which is resiliently urged in circumferential direction through action of a spring 62, one end of which is secured to the cage and the other to the shaft 59. The cage 61 is adapted to resiliently urge each of the rollers upwardly on angularly inclined surfaces of the shaft 59 into a wedging frictional engagement with an inner cylindrical surface formed within the housing 57, thereby effecting a transfer of driving power from the housing 57 to rotate the shaft 59. This arrangement also permits the shaft 59 to be rotated at a relatively high rate of speed regardless of whether or not the housing 57 is being rotated, since, in either case rotation of the shaft 59 causes a withdrawal of the rollers from frictional engagement with the housing 57.

From the shaft 59 a bevel gear 63 splined thereto transmits power to drive a pair of bevel gears 64 and 65, journalled on a shaft 66, in oppositely rotating directions. A clutch collar 67 splined to the rotatably journaled shaft 66 is provided with clutch teeth which may be engaged with complementary clutch teeth of either of the reversibly driven bevel gears 64 or 65, as shown in Figs. 3 and 4. A worm 69 also splined to the shaft 66 meshes directly with a worm wheel 70 keyed to an elongated bearing sleeve 71 which, in turn, is rotatably journaled in bearings 72 and 73 mounted in the spindle head 18.

A control trip drum 74 also keyed to the bearing sleeve 71 carries a driving pin 75 arranged to be axially slidable within a bored hole formed in a driving collar 76 which is removably clamped to the spindle 19 by means of a set screw 77. The control drum 74 is arranged to removably receive the feed regulating cam 50. As shown in Fig. 4, the driving collar 76 is clamped to the spindle 19 in abutting relationship to the cam 50 to restrict any forward or rearward slidable movement of the spindle 19. However, the driving collar 76 may be repositioned and reclamped to the spindle in order to permit a controlled axial slidable movement thereof.

To the end that the rotational feeding rate of of the work spindle 19 may be varied in accordance with the directional changes of cutting action, the feed regulating cam 50 of an irregular peripheral contour is removably secured to the rearward face of the drum 74 by means of cap screws 80, as shown in Figs. 2, 4 and 5. A follower 81, resiliently urged leftwardly to engage the peripheral contour of the cam 50, is of the yoke type, having two laterally extending arms 82 and 83 supported for axially slidable movement in journals 84 and 85 mounted in the spindle head 18, as best shown in Fig. 5.

A gear rack 86 integrally formed on the follower arm 83 meshes with a gear segment 87 keyed to a vertical shaft 88 which is rotatably journaled in bearings 89 carried by the spindle head. Keyed to the upper end of the shaft 88 is a gear segment 90 that meshes with a pinion 91 journaled on a parallelly mounted rotatable shaft 92. A tension spring 93 extending between a pin carried by the gear segment 90 and an inner wall of the spindle head 18 exerts yieldable pressure tending to rotate the gear segment 87 in a clockwise direction which, in turn, urges the gear rack 86 and the follower yoke 81 in a leftward direction, as shown in Fig. 6. Integrally formed with the pinion 91 is a circular plate 94 having a circle of equally spaced bored holes 95. The holes 95 adjacent the periphery thereof are arranged to be engaged by a plunger 96 which is supported for vertical axially slidable movement in a feed selecting dial 97 keyed to the shaft 92. The shaft 92 is journaled for rotation in a bearing 98 and has secured to its lower end a cam 99 rotatably journaled in a bearing 101. The cam 99 is provided with an irregularly contoured groove 102 adapted to engage a lever arm 103 which is laterally slidable to adjust the variable speed transmission 49 on rotational movement of the cam 99.

As shown in Fig. 4, the plunger 96 is engaged with a selected one of the holes 95 formed in the plate 94 in a manner that rotational movement of the plate will effect a concomitant movement of the dial 97, the shaft 92 and the cam 99 to vary the position of the lever arm 103 for adjusting the output speed of the variable speed transmission 49.

In order to increase or decrease the entire range of speed changes effectuated by the feed regulating cam 50, the plunger 96 may be disengaged from the plate 94 and, after being angularly adjusted, reengaged in another of the holes formed in the plate 94 to effect the desired changes in the relative angular positions of the dial 97 and the plate 94. With the follower 81 engaging a point 104 on the periphery of the feed regulating cam 50, the dial 97 and the plate 94 are preferably moved into positions of relative angular adjustment about their common rotational axis to adjust the transmission 49 for rotating the work spindle 19 at a feeding rate calculated to produce the highest degree of cutting efficiency on a corresponding point on the periphery of the workpiece 27. As the work spindle 19 carrying the workpiece 27 and the feed regulating cam 50 revolves in clockwise direction, from the position shown in Fig. 5, the follower 81 will be moved leftwardly to adjust the transmission 49 for driving the spindle 19 at a relatively faster rate of speed. Corresponding changes in adjustment of the transmission 49 will be effected as the cam 50 is rotated through a complete revolution or cycle of movement in order to maintain a relatively constant rate of surface speed of the cutter 26 on the workpiece 27. Since the point 104 on the periphery of the cam 50 is farthest from the rotational axis thereof, the slowest rate of rotational feeding movement of the workpiece 27 will be effected when the cutter 26 engages a corresponding point on the periphery of the workpiece. Assuming that the dial 97 has been predeterminately positioned in relation to the plate 94 to adjust the transmission 49 for producing the lowest required rate of output speed with the follower 81 engaging the point 104 of the cam 50, the plunger 96 will then be engaged with the appropriate one of the holes 95 for retaining the dial and plate in their respective, angularly adjusted positions for unitary movement in automatically regulating the feeding action.

To increase the relative feeding rate of the workpiece 27 and the cutter 26, the plunger 96 may be withdrawn from engagement with the circular plate 94 and the dial 97 rotated in clockwise direction until the plunger can be engaged in the next or any succeeding one of the holes 95 in the plate 94. In practice, the feeding rate selected would be the highest possible consistent with a good machined finish on the workpiece and the maximum degree of efficient operation.

In changing the machine for milling a workpiece having a different peripheral contour, it will be necessary to remove both the pattern 28 and the feed regulating cam 50 for the purpose of substituting a pattern and cam having the necessarily different configuration. While the pattern 28 is keyed to the spindle 19 and secured thereto in the usual manner, the feed cam 50 is bolted to the rearward face of the trip drum 74 in a manner to form a part of the automatic feed controlling mechanism for the spindle 19. To remove the cam 50, the rearward spindle bearing 107 along with its supporting yoke 108 may be removed from the spindle head 18 by withdrawing cap screws 109, as shown in Fig. 2. The spindle driving collar 76 is then removed from the spindle 19 in order to withdraw the cap screws 80 for removing the feed regulating cam 50, as shown in Figs. 4 and 5. Another feed regulating cam having a different irregular peripheral contour may then be secured to the trip drum 74 and the machine again prepared for operation by reversing the procedure outlined.

If it is desired to perform a machining operation not requiring a variation in the feeding rate of the work spindle 19, it is not necessary to place a feed regulating cam on the trip drum 74. Although the follower yoke 81 will remain in the machine, it will be resiliently urged by the spring 93 to its extreme leftward, inactive position in the absence of a feed regulating cam. With the automatic controlling mechanism thus rendered inoperative, the feed selection dial 97 may be manipulated to adjust the feed transmission 49 for supplying a uniform, non-varying feeding rate.

To this end, the feed selection dial 97 may be released for manual rotation independently of the circular plate 94 by upward movement of a knob 110 secured to the end of the axially slidable plunger 96. A compression spring 111 seated in an enlarged bore 112 is arranged to exert pressure against a collar 113 pinned to the plunger 96 and resiliently operates to urge both the plunger and the knob to their uppermost positions. A vertical groove 114 formed on the inner surface of a bearing sleeve 115 is arranged to engage a pin 116 extending laterally through the plunger 96 in a manner to limit the upward movement thereof. With the knob 110 in its uppermost position, and the plunger 96 disengaged from the circular plate 94, the feed rate dial 97 is locked against free rotation. For this purpose a spring 117 clamped at its inner end between the feed dial 97 and a hub 118 is so arranged that its outer, vertically movable end engages one of a series of serrations 119 formed on the inner surface of a circular opening formed in the spindle head 18 immediately below the feed dial 97. The spring 117 is engaged near its outer movable end by the plunger 96 so that a partial downward movement of the knob 110 will effect disengagement of the spring from the serrations 119. Further downward movement of the knob 110 to its lowermost position will effect engagement of the plunger with one of the holes 95 in the cam actuated circular plate 94. To retain the plunger 96 in engagement with the plate 94, the knob 110 may be given a one-quarter turn in either direction in such manner that the pin 116 will engage a circular groove 120 formed on the inner surface of the bearing sleeve 115 and intersecting the lower end of the vertical groove 114. Conversely, the plunger 96 may be disengaged from the circular plate 94 by rotating the knob 110 to again align the pin 116 with the vertical groove 114, and allowing the spring 111 to urge the plunger upward. To manually rotate the feed dial 97 for directly adjusting the feed transmission 49, both the plunger 96 and the lock spring 117 may be retained in disengaged position by holding the knob 110 in a position midway between its upper and lower limits of movement.

For effecting independent selective reversal of the direction of power movement of the work spindle, there is providing at the left side of the spindle head 18, a spindle controlling lever 121 that is adapted for leftward or rightward pivotal movement from a neutral position as well as for pivotal movement toward or away from the spindle head 18. As shown in Figs. 3 and 4, the lever 121 has formed toward its lower end an enlarged spherical portion adapted to fit within a hollow cylindrical cavity formed within a block 122 that in turn is secured to a hollow shaft 123 rotatably journalled within the spindle head 18. A pin 124 secured to the block 122 and extending transversely through the enlarged portion of the lever 121, operates as a pivot upon which the lever may be tilted to its forward or rearward position. Leftward or rightward movement of the lever 121 is arranged to pivotally operate the hollow shaft 123 that has formed on its inner end a gear segment 125 that meshes with rack teeth on a shifter fork 127 slidably mounted on a bar 128. The shifting fork 127 is provided with a shoe 129 operating in a peripheral groove of the reversing clutch spool 67. When the lever 121 is in the central neutral position shown in Fig. 3, the clutch spool 67 is disposed in a neutral position out of engagement with the reversing bevel gears 64 and 65 and whereupon the bevel gears may rotate on the shaft 66 without effecting rotational movement thereof. With the driving motor 51 energized, both the drive shaft 59, the bevel gear 63 and the reversing bevel gears 64 and 65 will be rotated at the selected feeding rate as hereinbefore explained and as shown in Figs. 3 and 4. When the lever 121 is in the forward position and is moved selectively to the left or right, the clutch spool 67 will be engaged to effect rotation of the work spindle 19 at feeding rate in either clockwise of counterclockwise direction respectively. In order to retain the lever 121 in either leftward, neutral or rightward position, a gear segment 130 secured to the hollow shaft 123 is arranged to engage a resiliently actuated detent plunger 131 in a well known manner.

For effecting reversal of the direction of power movement of the work spindle 19 at a rapid traverse rate of speed, the control lever 121 may be tilted to its outward position and then pivoted either rightwardly or leftwardly to effect engagement of the clutch spool 67. Outward movement of the lever 121 operates to effect an inward movement of a rod 132 contained within the hollow shaft 123 for axial slidable movement. A pivotally mounted bell crank 133 is arranged with one arm engaging the rod 132 and the other arm engaging a transversely mounted axially slidable shifter rod 134 having pinned to its outward end a shifting fork 135. The shifting fork 135 is provided with a shoe 136 operating in a peripheral groove of a clutch spool 137 which is slidably mounted on the rotatable drive shaft 59. A rapid traverse clutch 138 of the frictional disk type is provided with outwardly extending pivotal fingers 139 arranged to be actuated by the clutch spool 137 in a well known manner. Power for driving the outer rotatable housing of the rapid traverse clutch 138 is derived from a gear 140 that in turn is driven by a gear 141 mounted directly on the motor drive shaft 52. A rightward movement of the clutch spool 137, as induced by an outward movement of the lever 121, will effect engagement of the clutch 138 to rotate the shaft 59 and the bevel gear 63 secured thereto at a rapid traverse rate of speed. Thus, a movement of the lever 121 to its outward position and thence either rightward or leftward effects a sequential engagement of the rapid traverse clutch 138 and the clutch spool 67 to rotate the work spindle 19 at the fast or rapid traverse rate of speed in either selected direction.

Manual rotation of the work spindle 19 may be effected whenever the control lever 121 is in neutral position by applying a hand crank (not shown) to a squared end 143 of the vertical shaft 66 extending upwardly from the spindle head 18, as shown in Figs. 2 and 3.

For controlling rotational movement of the work spindle 19 automatically, there are provided a plurality of trip dogs 144 adjustably positionable in a peripheral T-slot formed in the control drum 74 and disposed to engage an arm 146 secured to a rotatably journalled trip shaft 147, as shown in Fig. 4. The trip shaft 147 is provided with an outwardly extending portion having keyed thereto an outwardly slidable hollow shaft 148. The slidable shaft 148 has secured to its inner end a gear segment 149 arranged to be resiliently retained in engagement with a rack 150 formed on the axially slidable shifter fork 127. With the work spindle 19 being operated at feeding rate, the trip dog 144 may be positioned on the trip drum 74 in a manner to stop spindle rotation at any predetermined point. Rotational actuation of the shaft 147 as effected by the trip dog 144 operates to rotate the gear segment 149 for moving the shifter fork 127 and the clutch spool 67 to neutral disengaged position, and incidentally operates to return the control lever 121 to its neutral position. In the event a particular machining operation requires continued feeding movement of the spindle 19 beyond the point where the trip dog 144 has been predeterminately positioned to stop rotation, the hollow shaft 148 may be moved outwardly by means of a knob 151 secured thereto in a manner that the gear segment 149 is momentarily disengaged from the shifter fork rack 150 to prevent movement of the clutch spool 67 to the neutral position.

In addition to the machining of periphery or face cams as hereinbefore described, the mechanism embodying this invention is also adapted for machining cams of the barrel type. As shown in Fig. 7, which diagrammatically portrays this application of the invention, a workpiece 152 is mounted on the forward portion of the work spindle 19 in position to be engaged by a cutter 153 mounted on the spindle 12. A barrel type cam 154 having a peripheral cam track 155 of the shape to be formed on the workpiece 152 is mounted on the rearward portion of the spindle within the spindle head 18. In order to position the cam 154 on the work spindle 19, it is necessary to remove the bearing supporting yoke 108, the drive collar 76, and feed regulating cam 50 as hereinbefore explained and as shown in Figs. 2 and 4. With the feed regulating cam 50 removed, the driving collar 76 may then be reclamped to the spindle 19 in a manner to permit axial slidable movement thereof while still retaining engagement with the driving pin 75. After the barrel type cam pattern 154 has been placed in position on the work spindle 19, with a key locking it against rotation, the yoke 108 may again be reclamped to the spindle head 18.

As shown in Fig. 7, a bracket 156 having a hardened follower pin 157 secured thereto is secured to an inner face of the spindle head 18 in a manner that the pin 157 engages the peripheral track 155 of the cam 154. A T-slot (not shown) provided on an inner wall of the spindle head 18 and formed parallelly with the spindle 19 is arranged to receive a clamping bolt (not shown) by which the bracket 156 and pin 157 may be adjustably positioned in relation to the cam pattern 154. With the bracket 156 clamped in adjusted position as shown in Fig. 7, engagement of the follower pin 157 with the peripheral track of the pattern 154 will effect controlled axial movement of the work spindle 19 whenever the spindle is rotated, in a manner that cutting action of the cutter 153 on the workpiece 152 will machine therein a peripheral groove or track of predetermined form.

In milling a cam workpiece of the barrel type as illustrated in the drawings, the power for axially moving the work spindle 19 is supplied by the rotative movement thereof. The hardened follower pin 157 is ground to precise limits to retain an extremely close sliding fit within the parallel, opposed faces of the cam track 155. Reversal in the direction of axial movement of the work spindle 19 is thus effected when the driving pressure exerted against the pin 157 is shifted from one face of the cam track 155 to the other.

In the event it is necessary to utilize a pattern of the open leader type, instead of one having a closed leader as shown in Fig. 7, only one guiding face of the peripheral groove will be available to contact the stationary follower pin 157 in order to control the axial slidable movement of the work spindle 19. It is then necessary to urge the work spindle 19 rightwardly to retain the irregular face of the cam in guiding relationship with the follower pin 157. To this end the rightward end of the work spindle 19 is provided with a separately rotatable bracket 158 to which the flexible cable 32 may be secured as is shown in Figs. 1 and 2. The cable 32 being threaded over the pulley 33 journalled in the removably positionable bracket 34 has secured to its lower end the weight 31 serving to urge the work holding spindle rightwardly in manner to retain the one guiding face of an open leader barrel cam in a guiding relationship with the follower pin 157.

As hereinbefore explained, power operable means are also provided for moving the spindle head 18 either longitudinally or transversely to the column 11, as shown in Fig. 1. For this purpose, control levers 159 and 160 mounted on the housing bracket 40 at the leftward end of the saddle 15 are manipulable for effecting longitudinal movement of the table 16 or transverse movement of the saddle 15 respectively, as shown in Figs. 1 and 9. The mechanism for effecting power operable movement including the driving motor 46 is contained within the housing bracket 40 as is more clearly shown in Figs. 8 and 10. The pivotally mounted control lever 159 being resiliently returnable to a neutral position is leftwardly movable to effect leftward movement of the table 16 and rightwardly movable to effect a corresponding rightward movement of the table. In a similar manner, the control lever 160 is leftwardly or rightwardly movable from the neutral position to effect inward or outward movement of the saddle 15 respectively. Movement of either the lever 159 or the lever 160 operates to energize the reversible driving motor 46 and simultaneously therewith to actuate clutching mechanism for transmitting driving power from the motor 46 to selectively move either the saddle 15 or table 16.

The driving motor 46 is adapted to drive a vertical multiple worm shaft 161 journalled in the bracket 40 and having meshing engagement with worm wheels 162 and 163 which are rotatably journalled on a drive shaft 41 and the table feed screw 45 respectively, as shown in Figs. 8 and 10. A collar 165 having axially splined engagement with an extension of the feed screw 45 is provided with clutch teeth 166 adapted to engage complementary clutch teeth formed on the hub of the worm wheel 163. A pivotally mounted bell crank 167 is arranged with one of its arm engaging a peripheral groove in the collar 165 and the other pivotally connected by means of an interconnecting link 168 to an arm 169 that in turn is keyed to a control lever shaft 170. Thus a pivotal movement of the shaft 170 in either a rightward or leftward direction operates to pivot the bell crank 167 which in turn effects leftward movement of the clutch collar 165 into engagement with the worm wheel 163. To retain the collar 165 and the shaft 170 in a neutral disengaged position as shown in Fig. 8, a detent plunger 172 is urged rightwardly by means of a spring 173 to engage a V-shaped notch in the bell crank 167.

In addition to effecting clutch engagement of the collar 165 to the worm wheel 163, a pivotal movement of the lever 159 rotates the shaft 170 to effect energization of the drive motor 46 for either clockwise or counterclockwise rotation. To this end, a pair of micro-switches 174 and 175 are secured within the bracket 40 in a manner to be selectively actuated by a cam 176 keyed to the rotatable shaft 170, as shown in Fig. 9. The electric switches 174 and 175 are individually connected in a well known manner to energize the motor 46 for rotation in a forward or reversed direction respectively. When the lever 159 and shaft 170 are in the neutral inactive position, the cam 176 is also arranged to be in a neutral position midway between the switch actuating buttons 177 and 178. Thus a leftward movement of the lever 159 will rotate the cam 176 to actuate switch 175 for energizing the motor 46 in a reversed direction of rotation, and simultaneously therewith, effect engagement of collar 165 to the worm wheel 163, thereby causing a power rotation of the feed screw 45 for effecting leftward longitudinal movement of the table.

In order to prevent the outer squared end of the manually rotatable stub shaft 44 from rotating at a high rate of speed whenever the table 16 is power operated, manipulation of the control lever 159 is also arranged to effect disengagement of the shaft 44 from the feed screw 45.

To this end, the detent plunger 172 has pinned to its outer end a fork 180 arranged to engage a peripheral groove formed on the stub shaft 44 in a manner that an outward movement of the plunger 172 will effect a corresponding movement of the stub shaft 44. This in turn effects a disengagement of clutch teeth 42 carried by the stub shaft 44 from the collar 43 pinned to the outer end of the feed screw 45. As shown in Fig. 8, the manually rotatable stub shaft 44 is clutch engaged with the feed screw 45 whenever the detent plunger is in its resiliently urged inward position with the conical end thereof engaging the V-shaped notch in the bell crank 167. Manipulating the control lever 159 to rotate the shaft 170 for effecting power actuated longitudinal movement of the table 16 as hereinbefore explained, operates to pivot the bell crank 167 with a resultant lateral movement of the notch located therein acting to move the detent plunger 172, the fork 180 and the stub shaft 179 outwardly. On releasing the control lever 159, the resiliently urged rightward movement of the detent plunger 172 operates to return the bell crank 167 to a neutral position and simultaneously therewith to move the stub shaft 44 rightwardly into clutch engagement with the table feed screw 45.

To provide for transverse power actuated movement of the saddle 15, the control lever 160 is pivotally operable to actuate control mechanism generally similar to that employed for obtaining power movement of the table 16. This mechanism comprises a rotatably journalled shaft 181, an arm 182 keyed thereto, a link 183 and a pivotally mounted bell crank 184. A clutch collar 185 is carried in slidably splined engagement on the shaft 41 for leftward movement into driving engagement with the worm wheel 162 or for rightward movement into a disengaged position as effected by a selective pivotal movement of the bell crank 184. With the clutch collar 185 in the neutral disengaged position shown in Fig. 8, a detent plunger 186 will engage a notch in the bell crank 184 will then be in a resiliently urged rightward position. A fork 187 carried by the plunger 186 will also be urged rightwardly to effect movement of the stub shaft 39 into clutching engagement with the collar 43 pinned to the shaft 41. The rotatable shaft 181 also carries a cam 189 which is selectively movable to actuate either of two micro-switches 190 and 191 connected to energize the drive motor 46 for clockwise or counterclockwise rotation, as shown in Fig. 9.

From the foregoing explanation of the construction and operation of a preferred embodiment of the invention, it is apparent that the invention has provided an improved machine of simplified construction for the efficient production of a wide variety of cam or like workpieces. Adjustments necessary when changing from the milling of one specific type of workpiece to another may be made with speed and facility, substituting a pattern of the required irregular contour and a cooperating cam of irregular contour to insure duplicating the correct configuration on the workpiece to be milled with a consistently high standard of efficiency and finish on the machined surface.

Although only one embodiment of the invention has been shown and described, it will be apparent to those skilled in the art to which this invention relates, that various modifications in the manner of constructing the machine may be effected without departing from the spirit and scope of the invention as defined in the subjoined claims.

The principles of the invention having now been fully explained in connection with the foregoing description of embodying structure, I hereby claim as my invention:

1. A cam milling machine comprising a column, a spindle rotatably journalled in said column, a knee slidably mounted on said column, a saddle slidably mounted on said knee, a table slidably mounted on said saddle for longitudinal movement thereon, a support element rotatably mounted on said table, a headstock slidably mounted on said support element, a work carrying element rotatably journalled on said headstock, a pattern of predetermined irregular peripheral contour removably affixed to said work carrying element and rotatable therewith, follower means adapted to coact with said pattern to effect movement of said work spindle relative to said work carrying element for forming a predetermined peripheral contour on a workpiece mounted thereon, an infinitely variable speed transmission, driving means connecting said transmission to drive said spindle, manually operable control means selectively connectible to adjust said variable speed transmission, a feed regulating cam removably affixed to said spindle for rotation therewith, a cam follower engageable with the peripheral contour of said feed regulating cam and operatively connected to automatically adjust said variable speed transmission, rapid traverse transmission means connectible to drive said spindle at a rapid traverse rate of movement, and control means selectively operable to connect either said variable speed transmission or said rapid traverse transmission means to drive said spindle and including tripping means operatively connected to actuate said control means for predeterminate operation.

2. In a pattern controlled milling machine, a frame, a cutter carrying spindle journalled in said frame, a table slidably mounted for longitudinal movement on said frame, a headstock rotatably mounted on said table, a work carrying spindle journalled in said headstock, a pattern of predetermined contour adapted to be mounted on said spindle for rotation therewith, a follower roller adapted to engage said pattern to effect movement of said work spindle relative to said cutter for guiding said members in forming a workpiece with a peripheral contour substantially the same as said pattern, a feed regulating cam adapted for movement with said workpiece spindle, a cam follower slidably mounted in said headstock arranged to be moved by said feed cam, a variable speed transmission connected to drive said workpiece spindle, a manually movable control lever connectible to adjust said transmission, and control means actuatable by movement of said cam follower connected to automatically adjust said speed transmission, whereby the rotational feed rate of the workpiece is coordinately controlled in relation to the changing peripheral contour to be formed thereon to effect a relatively constant cutting action at any point on the periphery of the workpiece.

3. In a machine tool; a frame; a table slidably mounted on said frame; a shaft operatively connected to actuate said table; and controlling means operable to rotate said shaft for moving said table on said frame; said controlling means comprising a stub shaft clutch engageable with said shaft to effect manual rotation thereof, resilient means operative to move said stub shaft to an inactive disengaged position, a reversibly energizable motor, a gearwheel journalled on said shaft rotatably driven by said motor, a clutch element mounted on said shaft, a forward switch and a reversing switch connected to control said motor, and a manually operable pivotally movable control lever adapted to selectively actuate either said forward or said reversing switch respectively and simultaneously therewith to move said clutch element into driving engagement between said gearwheel and said shaft.

4. In a cam milling machine, a frame, a milling cutter rotatably mounted on said frame, a work supporting spindle rotatably mounted on said frame in cooperative relationship with said milling cutter, power actuated means operatively connected to rotate said milling cutter, variable speed power driving means operatively connected to turn said work supporting spindle at selected speed, a pattern mounted on said work supporting spindle, a follower mounted on said frame in position to cooperate with said pattern in guiding the action of said cutter upon a workpiece on said work spindle to reproduce said pattern, a feed control cam likewise mounted on said work supporting spindle for rotation with said pattern, and control means responsive to operation of said feed control cam and operative to adjust said variable speed spindle driving means in accordance therewith, whereby to regulate the rate of rotation of said work spindle in manner to effect a desired rate of cutting action between said cutter and the workpiece appropriate to each increment of said pattern being reproduced.

5. In a machine tool controlling mechanism, a plurality of driven shafts adapted to be rotated, a manually rotatable shaft axially concentric to each of said driven shafts and selectively connectible thereto, a worm wheel rotatably journalled on each of said driven shafts, reversibly energizable power means, a worm shaft arranged to transmit driving power from said power means to said worm wheels, a pivotal control lever movable in either direction from a resiliently returnable position, clutching means selectively actuatable on movement of said pivotal lever in either direction from said position to effect a driving connection between said worm wheel and said driven shaft, and a pair of switches operably associated with each of said control levers in a manner to be actuated respectively upon movement of said lever in the one or the other direction to energize said power means for rotation in a clockwise or counterclockwise direction respectively, whereby movement of said lever in one direction simultaneously actuates said clutching means and energizes said power means to effect the desired rotational movement of said driven shaft.

6. In a machine tool, rotary means for holding a workpiece, means for holding a cutting tool, a camming member shaped in conformity with the surface to be formed on the workpiece and disposed to effect relative cooperative displacement of said rotary means for holding the workpiece and said means for holding the cutting tool, a power source, a variable speed transmission adapted to connect said power source to drive said rotary means, a power source arranged to rotate said means for holding the tool at any predetermined rate of speed, adjusting means for regulating said variable speed transmission, a second camming member rotatably operative upon movement of said rotary means and operatively connected to control said adjusting means, and disconnecting mechanism operative to regulate said adjusting means independently of said second camming member, whereby the range of effective output speed from said transmission may be continuously varied in accordance with a desired rate of metal removal from said workpiece.

7. In a pattern controlled machine tool, a tool support, a cooperating relatively movable and rotatable work support, and an automatic feed regulating transmission mechanism, said mechanism comprising a variable speed transmission, a cam adapted to be rotated by said work support, an axially slidable cam follower having a gear rack integrally formed thereon adapted to be moved by said cam, intermediate gearing connected for actuation by said cam follower and movable to adjust said variable speed transmission whereby the rotational feed rate of said work support may be predeterminately controlled, and a manual control lever selectively connectible to adjust said variable speed transmission.

8. In a pattern controlled machine tool, in combination, a work supporting spindle, a cutter carrying member, a pattern disposed to effect relative displacement of said spindle and said cutter carrying member, said pattern having a configuration substantially the same as that to be formed on a workpiece mounted on said spindle, a variable speed drive mechanism disposed to rotate said spindle, a feed selector manually operable to adjust said drive mechanism, a cam of predetermined configuration removably mounted on said spindle, means connected to adjust said feed selector in accordance with said cam, and disconnecting means operable in such manner that said feed selector may be independently manually adjusted in order to change the range of automatic adjustments effected by said cam member.

9. In a transmission and control mechanism for effecting relative movements of machine elements, a variable speed power driven mechanism operatively connected to effect relative movement of the machine elements at a selectively varying rate, control means operatively connected to adjust the rate of movement effected by said variable speed mechanism including a manually operable member having latching means, a movable member disposed to be engaged by said latching means in manner to retain said latching means in adjusted relationship with said movable member, and a speed regulating cam operatively connected to move said movable member thereby to adjust said variable speed mechanism for effecting a varying rate of relative movement of the machine elements.

10. In a machine tool transmission and control mechanism, a rotatable member arranged to be driven at a predetermined constant speed or at a predeterminately varying speed, an infinitely variable speed transmission operatively connected to drive said member, control means connected to effect adjustment of said transmission, locking means arranged to lock said control means in predetermined adjusted position for rotating said member at a constant speed, and means for effecting mechanical adjustment of said control means including a cam removably secured to said member, a yoke disposed to be slidably moved by said cam and a motion transmitter selectively connectible to actuate said control means on movement of said yoke, whereby said transmission may be adjusted to rotate said member at a predeterminately varying rate of speed.

11. In an apparatus for controlling the speed of a machine tool spindle, an infinitely variable speed transmission mechanism operatively connected to rotate said spindle, a rotatable shaft connected to adjust said transmission mechanism, an indicating dial secured to the outer end of said shaft for effecting movement thereof, means for effecting manual adjustment of said dial including a plunger, said plunger being movable into a position wherein said dial may be manually adjusted and said plunger being movable into a position wherein said dial is locked in predetermined adjusted position, a circular member rotatably journalled on said shaft and presenting plunger receiving notches, said plunger being engageable with any one of said notches in said circular member in manner that said dial is movable therewith, a cam removably secured to said spindle, a yoke constituting a cam follower disposed to be slidably moved on rotational movement of said cam, and motion transmitting means interconnecting said yoke and said circular member, whereby said transmission may be adjusted manually to rotate said spindle at a predetermined constant speed or said transmission may be adjusted automatically to rotate said spindle at a predeterminately varying speed.

12. In a controlling mechanism for a machine tool, a driven shaft, a manually rotatable stub shaft axially concentric with said driven shaft, a clutch disengageably interconnecting said driven shaft and said stub shaft, resilient means normally operative to retain said stub shaft in clutching engagement with said driven shaft, a reversibly energizable motor, a member driven by said motor, clutch mechanism arranged to effect an operative connection between said motor driven member and said driven shaft whenever said stub shaft is disconnected therefrom, a pivotal control lever movable in either direction from a resiliently returnable neutral position determined by said resilient means said resilient means being operative on movement of said lever from its neutral position to effect disengagement of said stub shaft from said driven shaft, a pair of switches operative to energize said motor for clockwise or counterclockwise rotation, said switches being respectively actuatable on movement of said lever in one direction or the other from its neutral position, and linkage operative on movement of said lever in either direction to actuate said clutch mechanism for effecting an operative connection between said motor driven member and said driven shaft.

13. In a transmission and control mechanism for a machine tool having a carriage movable along two paths, actuating mechanisms operatively connected to move said carriage in each path respectively, a reversible electric motor for actuating said carriage, clutches selectively engageable to connect said motor to said actuating mechanisms respectively, clutch control levers operatively connected to said clutches respectively in manner to actuate each clutch selectively upon movement of its associated lever in either direction from a central neutral position, and a pair of reversing switches associated with each lever and connected to control operation of said motor in opposite directions respectively, one switch of each pair being disposed to be actuated by its associated lever when said lever is moved from neutral in one direction and the other switch being disposed to be actuated when said lever is moved from neutral in the opposite direction, the arrangement being such that said carriage may be moved in either direction along either path by operation of said motor in response to actuation of the appropriate lever in the selected direction.

14. In a milling machine having a tool spindle, a work carrying spindle arranged for cooperative operation with said tool spindle, means for effecting bodily displacement of said work spindle relative to said tool spindle including a pattern of predetermined configuration, an infinitely variable speed transmission operatively connected to rotate said work spindle, and control means connected to adjust said transmission for rotating said work spindle at a predetermined constant rate of speed or at a predeterminately varying rate of speed, said control means comprising a shaft connected to adjust said transmission, an indicating dial secured to said shaft, a circular control plate journalled on said shaft in coaxial relationship with said indicating dial, a plunger slidably carried by said dial for movement into engagement with said plate in manner to lock said dial to said plate for movement therewith, a feed regulating cam removably secured to said work spindle, a yoke engageable with said cam in manner to be moved thereby, a motion transmitter interconnecting said yoke and said plate whereby said plate will be moved to adjust said transmission for rotating said work spindle at a predeterminately varied rate of speed, a lever selectively operable to withdraw said plunger from engagement with said plate for effecting independent manual adjustment of said dial, and locking means operative to lock said dial in predetermined position for maintaining said transmission in an adjusted position to rotate said work spindle at a constant rate of speed.

JOSEPH B. ARMITAGE.

References Cited in the file of this patent

UNITED STATES PATENTS

| Number | Name | Date |
|---|---|---|
| 1,119,717 | Norton | Dec. 1, 1914 |
| 1,716,115 | Clark | June 4, 1929 |
| 1,749,073 | Graves | Mar. 4, 1930 |
| 1,750,885 | Goetz | Mar. 18, 1930 |
| 1,930,722 | McWhirter | Oct. 17, 1933 |
| 2,010,355 | Ernst et al. | Aug. 6, 1935 |
| 2,047,162 | Armitage | July 7, 1936 |
| 2,050,127 | Sassen | Aug. 4, 1936 |
| 2,100,296 | Wight | Nov. 23, 1937 |
| 2,114,013 | Ball | Apr. 12, 1938 |
| 2,153,101 | Schulz | Apr. 4, 1939 |
| 2,310,873 | Stephan | Feb. 9, 1943 |
| 2,379,870 | Barker | July 10, 1945 |
| 2,407,913 | Armitage | Sept. 17, 1946 |
| 2,415,801 | Armitage | Feb. 11, 1947 |

FOREIGN PATENTS

| Number | Country | Date |
|---|---|---|
| 436,243 | France | Jan. 18, 1912 |